United States Patent
Pernkopf

(10) Patent No.: US 11,780,138 B2
(45) Date of Patent: Oct. 10, 2023

(54) CLAMPING UNIT FOR A MOULDING MACHINE AND MOULDING MACHINE COMPRISING SUCH A CLAMPING UNIT

(71) Applicant: ENGEL AUSTRIA GmbH, Schwertberg (AT)

(72) Inventor: Friedrich Pernkopf, Gramastetten (AT)

(73) Assignee: Engel Austria GmbH, Schwertberg (AT)

( * ) Notice: Subject to any disclaimer, the term of this patent is extended or adjusted under 35 U.S.C. 154(b) by 0 days.

(21) Appl. No.: 17/837,585

(22) Filed: Jun. 10, 2022

(65) Prior Publication Data

US 2022/0396020 A1    Dec. 15, 2022

(30) Foreign Application Priority Data

Jun. 11, 2021  (AT) .............................. A 50474/2021

(51) Int. Cl.
  *B29C 45/66*  (2006.01)
  *B29C 45/68*  (2006.01)
(52) U.S. Cl.
  CPC .......... *B29C 45/661* (2013.01); *B29C 45/683* (2013.01); *B29C 2045/662* (2013.01)
(58) Field of Classification Search
  CPC ..... B29C 45/66; B29C 45/661; B29C 45/662; B29C 45/664; B29C 45/681; B29C 45/683
  See application file for complete search history.

(56) References Cited

U.S. PATENT DOCUMENTS

| | | |
|---|---|---|
| 4,938,682 A | 7/1990 | Kadoriku et al. |
| 8,414,287 B2 | 4/2013 | Wohlrab |
| 8,821,152 B2 * | 9/2014 | Keinath ................ B29C 45/661 425/593 |
| 10,625,453 B1 | 4/2020 | Senga |
| 2012/0107448 A1 | 5/2012 | Wohlrab |
| 2013/0224329 A1 | 8/2013 | Keinath |
| 2013/0307190 A1 * | 11/2013 | Nagatomi ............. B29C 45/661 425/595 |
| 2020/0108536 A1 | 4/2020 | Senga |

FOREIGN PATENT DOCUMENTS

| | | |
|---|---|---|
| DE | 10 2009 031 715 | 1/2011 |
| DE | 10 2019 214 441 | 4/2020 |
| EP | 0 389 622 | 10/1990 |
| EP | 2 456 607 | 4/2013 |
| EP | 2 629 954 | 8/2014 |

OTHER PUBLICATIONS

Office Action dated Feb. 28, 2022 in Ausliian Application No. A 50474/2021 with English translation.
"Chebychev-Grübler-Kutzbach criterion", Wikipedia, https//en.wikipedia.org/wiki/ChebychevE2%80%93GrC3%BCblet%E2%80%93Kutzbach_criterion.

* cited by examiner

*Primary Examiner* — Thu-Khanh T. Nguyen
(74) *Attorney, Agent, or Firm* — Wenderoth, Lind & Ponack, L.L.P.

(57) ABSTRACT

A clamping unit for a moulding machine, including a toggle mechanism. A movable moulding platen is movable with respect to a stationary moulding platen and/or can be acted on by a force of the toggle mechanism. The toggle mechanism is drivable by at least two drive units, and the at least two drive units are each connected in an articulated manner to at least one movably mounted toggle lever element of the toggle mechanism via at least one bearing point formed as an articulation.

17 Claims, 8 Drawing Sheets

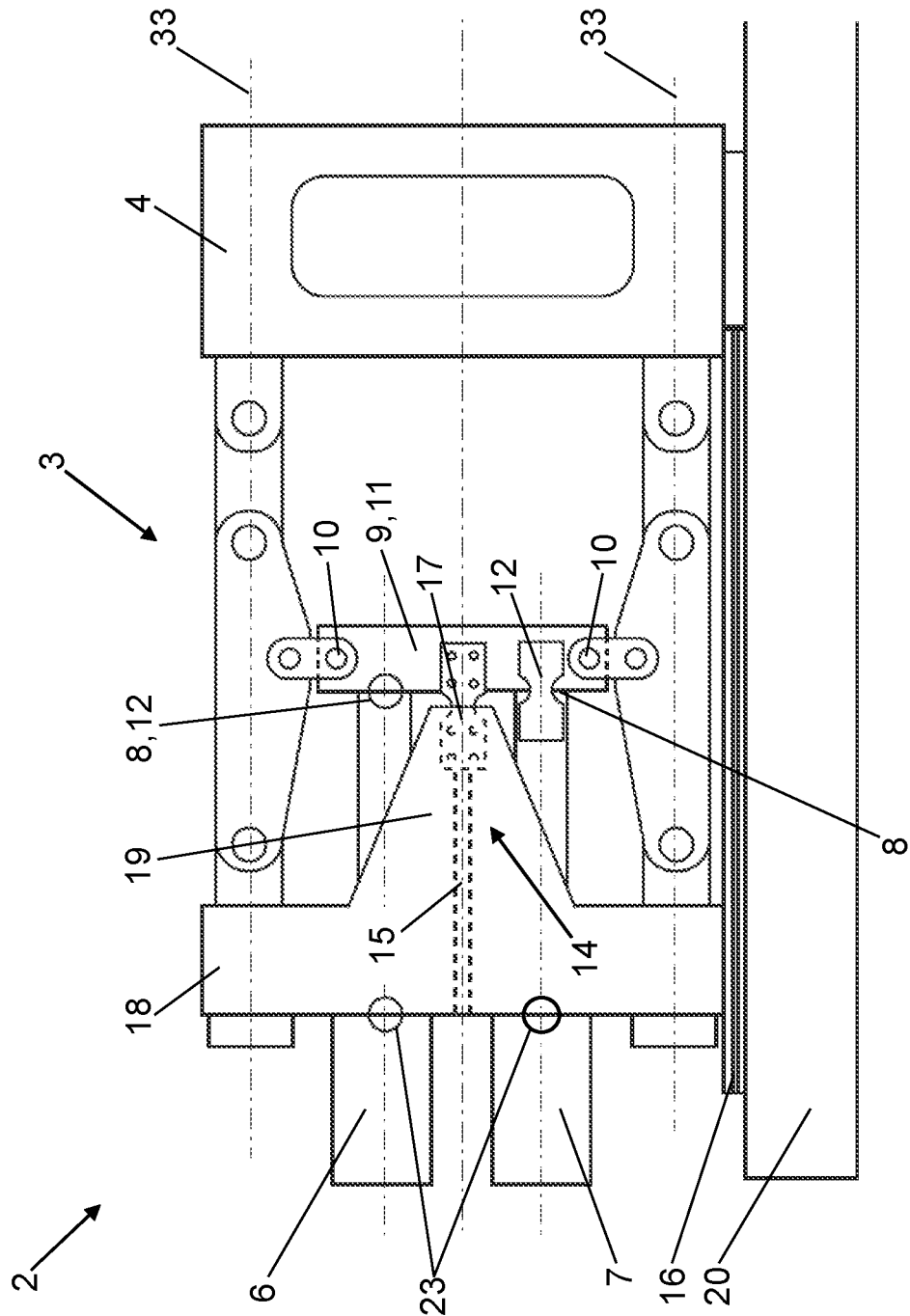

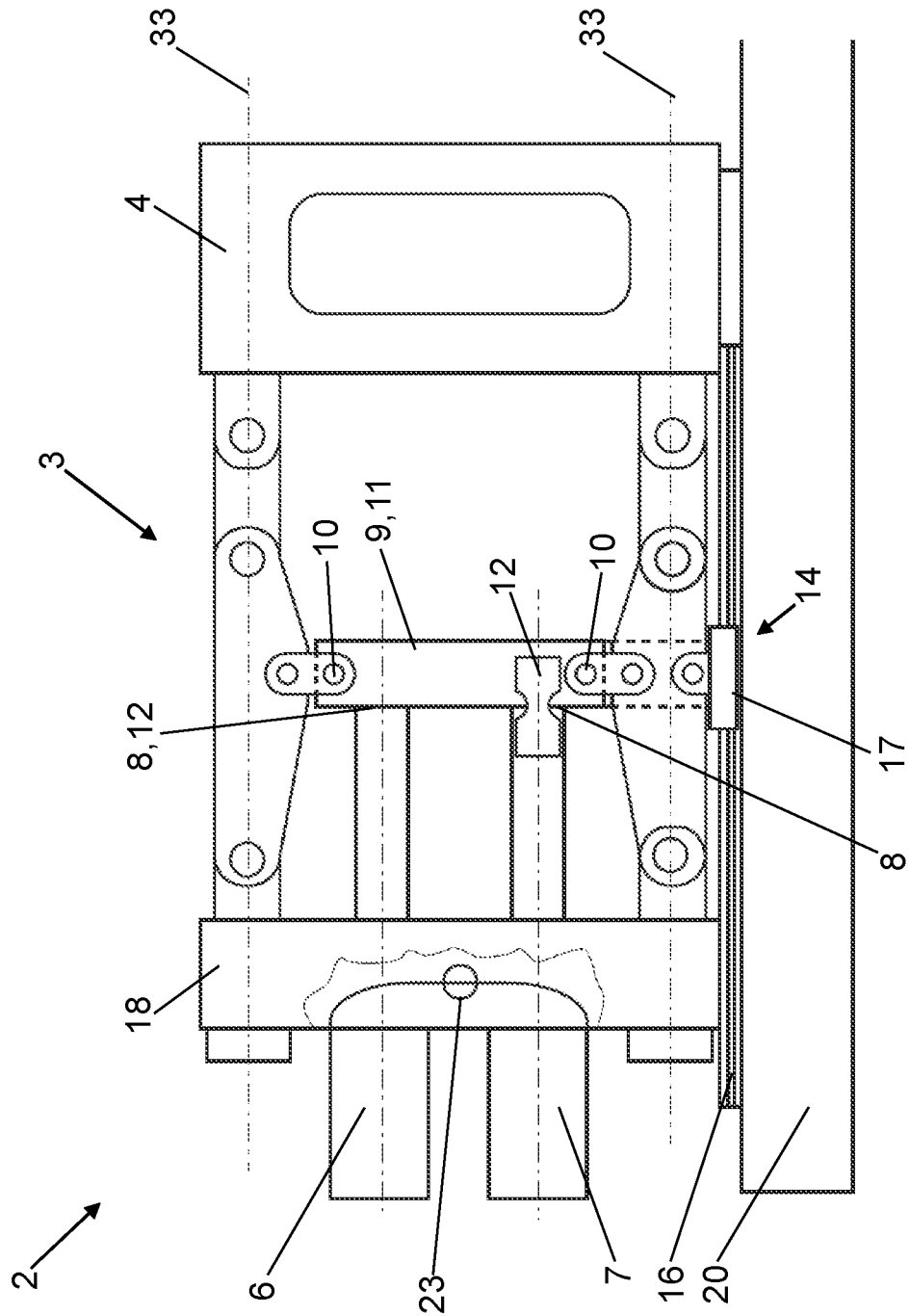

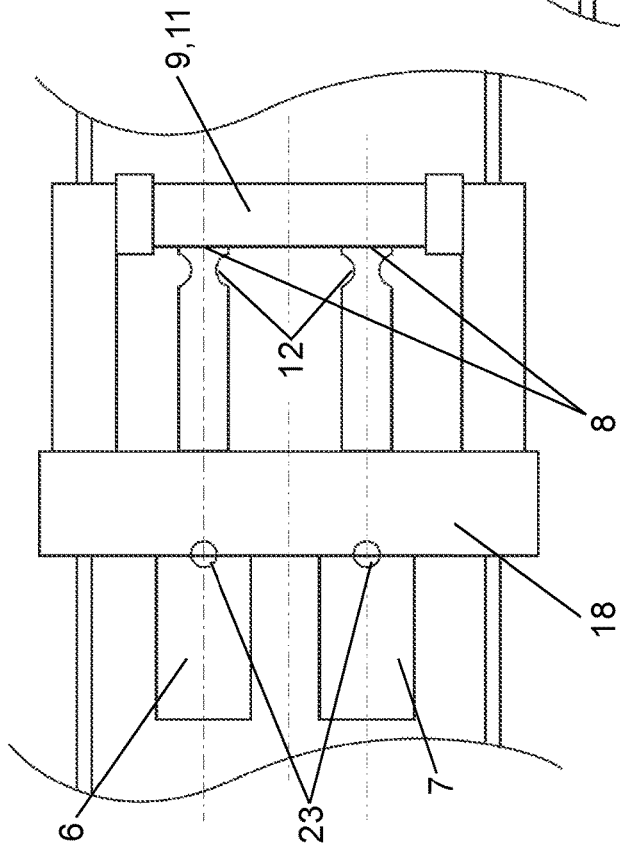
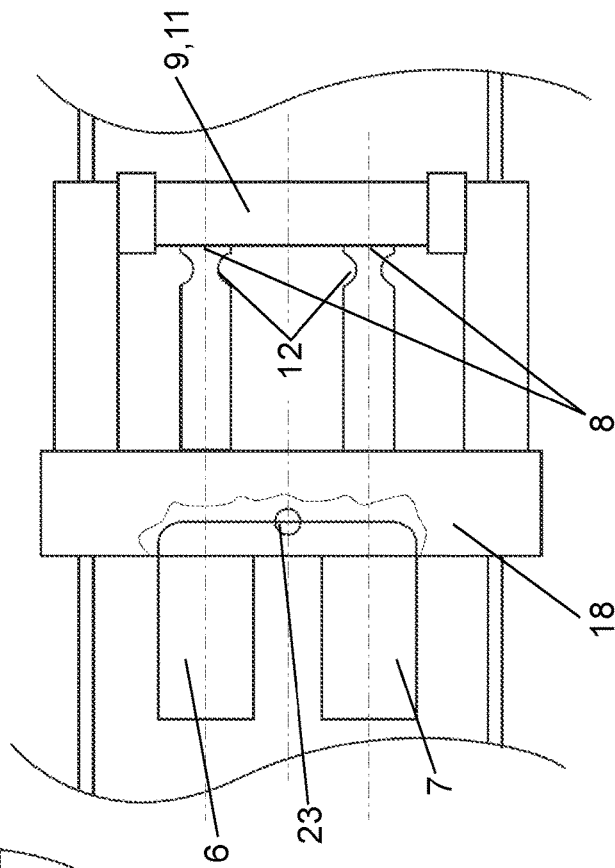

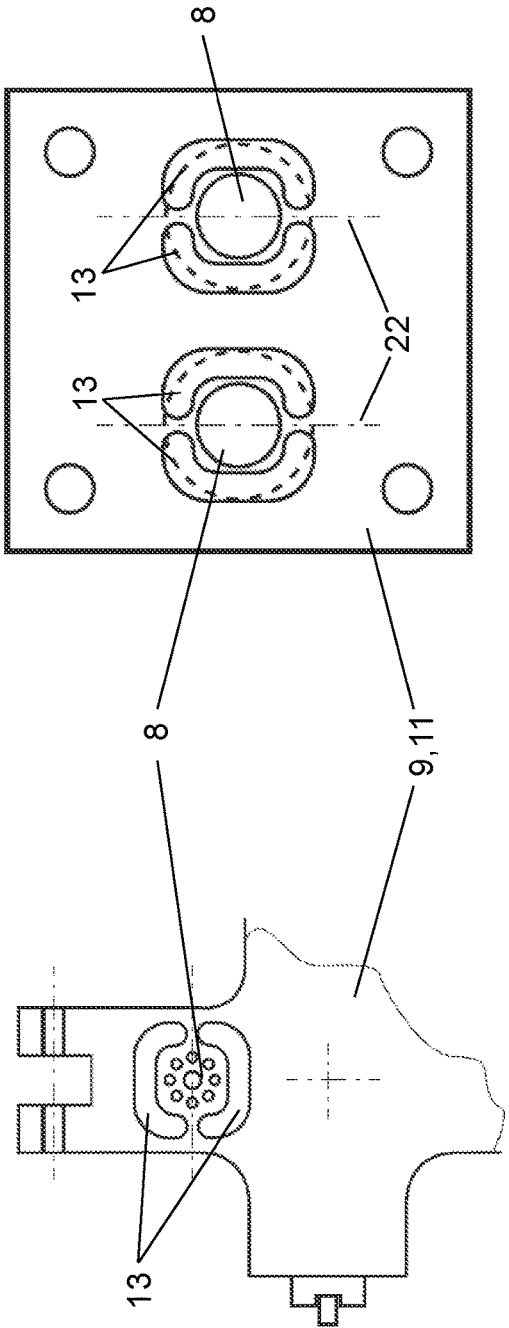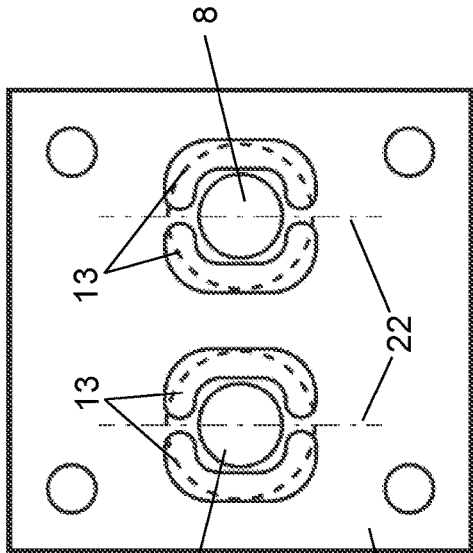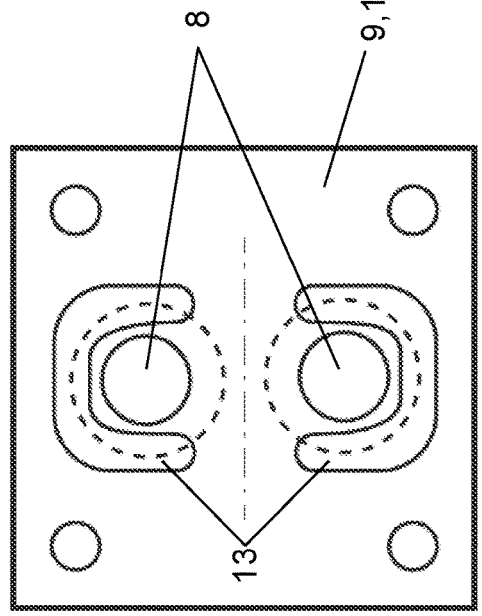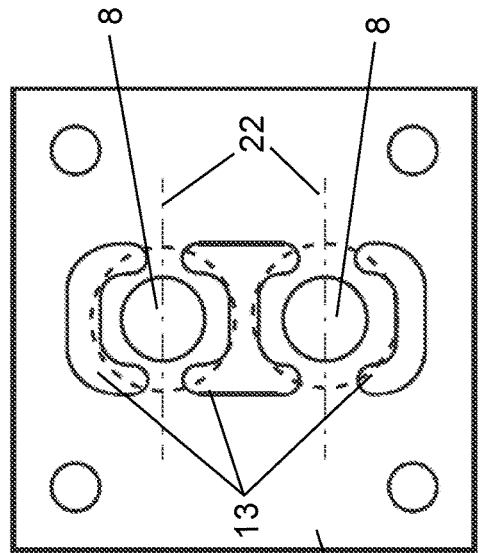

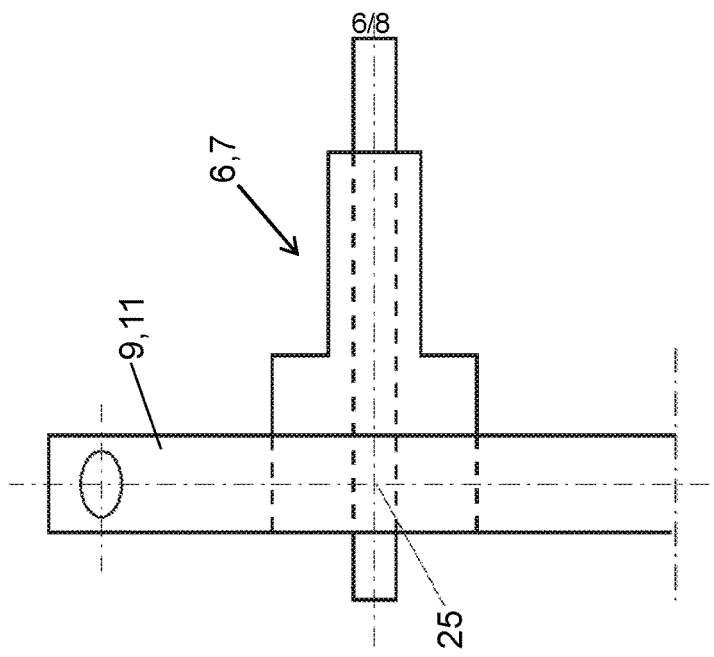
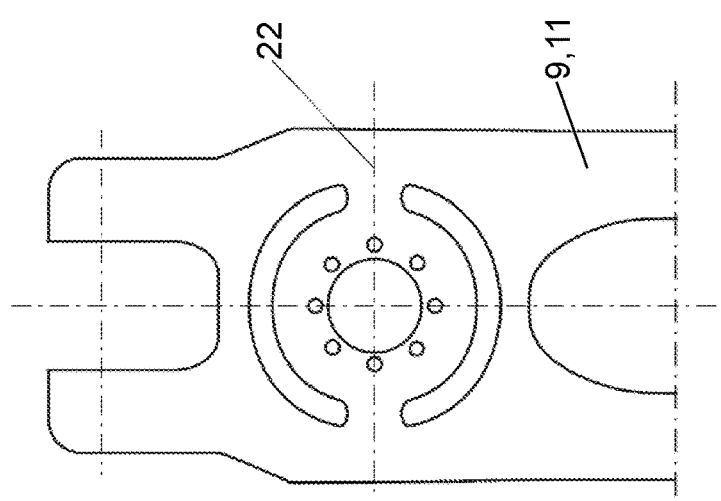
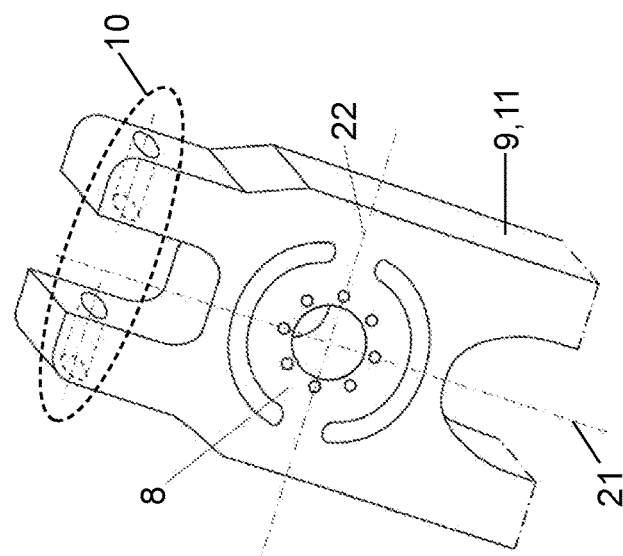

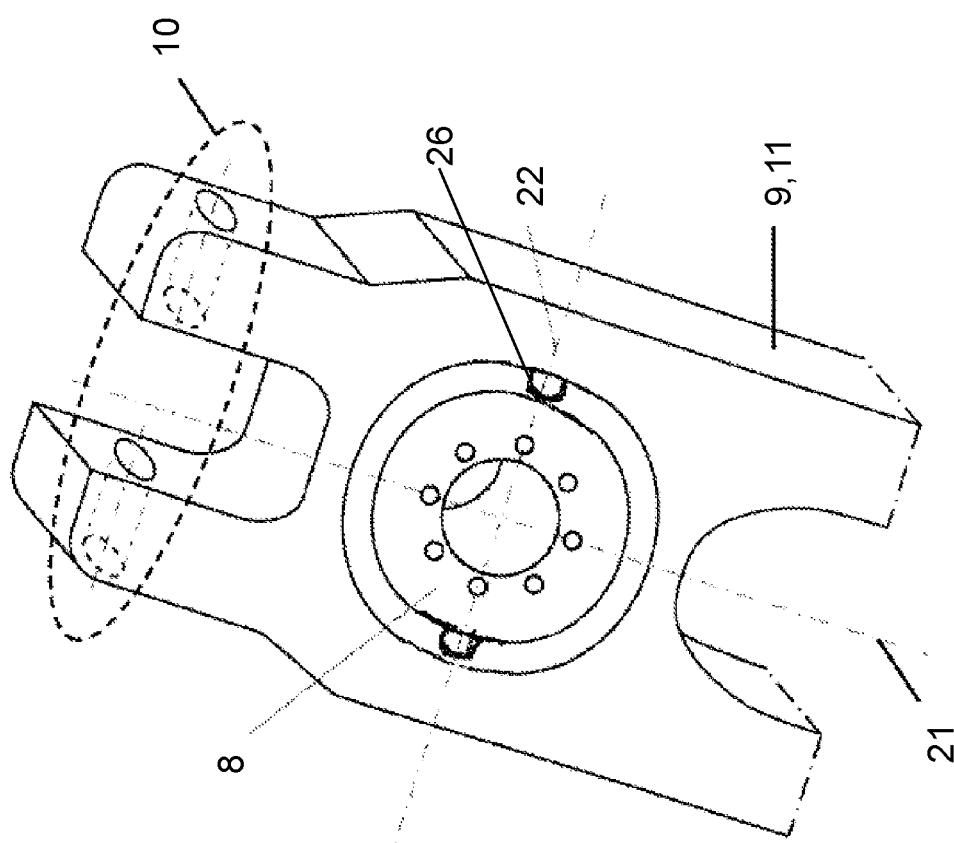

CLAMPING UNIT FOR A MOULDING MACHINE AND MOULDING MACHINE COMPRISING SUCH A CLAMPING UNIT

BACKGROUND OF THE INVENTION

The present invention relates to a clamping unit for a moulding machine, as well as a moulding machine with such a clamping unit.

By moulding machines can be meant injection moulding machines, transfer moulding machines, presses and the like. In the following, the state of the art is to be presented with reference to an injection moulding machine. The same naturally applies to moulding machines in general.

Generic clamping units for an injection moulding machine have a toggle mechanism, wherein a movable moulding platen is movable with respect to a stationary moulding platen and/or can be acted on by a force by means of the toggle mechanism, wherein the toggle mechanism is drivable by at least two drive units.

Corresponding clamping units emerge for example from EP 2 629 954 B1 or EP 2 456 607 B1, wherein a toggle mechanism is provided for moving and/or applying force to the moving moulding platen with respect to a stationary moulding platen. This toggle mechanism is driven via two drive units, which each engage on a toggle lever on opposite sides of the toggle mechanism.

However, it is disadvantageous that the two drive units have to be actuated as synchronously as possible and such that no asymmetrical driving force is exerted on the toggle lever. Asymmetrical driving forces can result in deformations of the toggle mechanism, which on the one hand has a negative effect on the life of the toggle mechanism (for example due to bearing damage occurring) and on the other hand has a negative effect on the parallel alignment of the fixed moulding platen relative to the moving moulding platen. Furthermore, it can happen that, due to asymmetrical stresses, the toggle mechanism becomes wedged or the bearing damage mentioned occurs.

However, this synchronous actuation of the at least two drive units and thus the uniform introduction of force into the toggle mechanism via the two drive units represents an outlay in terms of control technology that is not to be underestimated, since various drive units have certain tolerances from a manufacturing point of view alone, as a result of which different drive speeds and driving forces are also implemented by the same control signals. Furthermore, the drive units differ increasingly over the course of their life, since it cannot be assumed that they will be subjected to the same (identical) wear.

Furthermore, the application of force by at least two drive units of the toggle mechanism results in deformations of the drive units themselves, since they cannot engage directly in a symmetrical center of gravity of the toggle mechanism and are thus subjected to a deformation due to a resulting asymmetrical force.

However, due to the mounting of the at least two drive units on the toggle mechanism, in most cases this deformation is passed on directly to the toggle mechanism, which can lead to bearing damage to the toggle mechanism and thus to increased maintenance work.

Furthermore, this deformation of the at least two drive units of the toggle mechanism leads to inaccuracies in the clamping unit and thus to losses in quality in the moulded parts produced by the injection moulding machine.

However, it has become apparent that by driving the toggle mechanism via at least two drive units, the clamping unit can be acted upon and thus operated using much higher clamping forces, wherein small installation dimensions can still be maintained compared with the use of only one drive unit.

SUMMARY OF THE INVENTION

The object of the present invention is therefore to provide a clamping unit for a moulding machine as well as a moulding machine with such a clamping unit, in which the disadvantages known from the state of the art are at least partially remedied and/or a more uniform introduction of force into a toggle mechanism can be accomplished via at least two drive units.

According to the invention, a clamping unit for a moulding machine has a toggle mechanism, wherein a movable moulding platen is movable with respect to a stationary moulding platen and/or can be acted on by a force by means of the toggle mechanism, wherein the toggle mechanism is drivable by at least two drive units, wherein the at least two drive units are each connected in an articulated manner to at least one movably mounted toggle lever element of the toggle mechanism via at least one bearing point formed as an articulation.

Through the provision of the at least one bearing point formed as an articulation for each of the at least two drive units, within the framework of a deformation in the toggle mechanism and/or of the respective drive unit, the relationship between the respective bearing point, the toggle lever element and the respective drive unit can be decoupled in a targeted manner, as a result of which deformations of the drive unit coupled to the bearing point or of the toggle lever element are not transferred directly or are transferred to a reduced extent, without additional elements for the decoupling needing to be provided.

Possible constraints which exist between the parts of a toggle mechanism, for example due to a geometric overdetermination (cf. Grübler, Kutzbach: "Degrees of freedom of mechanisms"), can be resolved, prevented or removed by an embodiment variant according to the invention.

Bending stresses, for example on linear drives, can thus be reduced or eliminated in a simple manner.

By moulding machines can be meant injection moulding machines, transfer moulding machines, presses and the like. Moulding machines in which the plasticized material is supplied to an open mould are also entirely conceivable.

A clamping unit according to the invention can be employed through use in already-known embodiment variants of the state of art, as described in the introduction to the description for example, and installed subsequently.

Advantageous embodiments and exemplary variants are defined with reference to the dependent claims.

Preferably, the movably mounted toggle lever element is formed as a bearing plate, preferably as a crosshead, of the toggle lever element, and the bearing plate has at least two bearing points for connecting at least one drive unit to the bearing plate and at least one fastening point for connection to the toggle mechanism, in particular to at least one toggle lever.

In the course of the present document—when a plate is mentioned—a flat, planar plate is not necessarily to be assumed. It can also have indentations and elevations. Embodiments with ribs for stabilization are also entirely conceivable. All usual embodiments of crossheads for toggle mechanisms are also considered to be a bearing plate within the meaning of the present document.

Preferably, the bearing plate has at least one articulation connecting the at least one fastening point to the at least two bearing points, with the result that a twisting between the at least two bearing points caused by a driving force and a reactive force can be at least partially compensated for by the at least one articulation.

Preferably, the bearing plate is formed in one piece.

Alternatively or in addition, the bearing plate is formed in at least two pieces and the parts of the bearing plate can be connected by at least one articulated element.

The at least one articulation can be formed as a flexure hinge.

The at least one articulation can be formed through at least one clearance and the at least one clearance preferably has recesses, drilled holes and/or openings, and particularly preferably varies a thickness of the bearing plate and/or penetrates the thickness of the bearing plate.

The bearing plate can have at least one guide, which is suitable for guiding the bearing plate on at least one guide pillar and/or at least one guide rail.

Preferably, the at least one guide pillar and/or the at least one guide rail is mounted on:
- an end plate of the clamping unit and preferably at least one fastening lug protruding from the end plate and/or
- a frame of the clamping unit.

Alternatively, the at least one guide pillar can be formed as a tie bar of the clamping unit, and the movable moulding platen is preferably also guided on the tie bar with respect to the fixed moulding platen and/or the machine frame.

Preferably, at least one further articulation is formed between the at least one guide and at least one of the at least two bearing points.

The at least one articulation and/or the at least one further articulation can be formed as a flexure hinge.

In an undeformed state of the bearing plate, the at least two bearing points and the at least one fastening point can lie along a common imaginary connecting line, and a driving force can be introduced into the bearing plate along a force direction via the at least two bearing points. A pivot axis of the at least one articulation runs at right angles to the connecting line and at right angles to the force direction.

Preferably, the at least two drive units have at least one spindle drive and/or at least one piston-cylinder unit.

The at least two drive units can have a hydraulic, pneumatic, electrical, magnetic drive and/or a hybrid variant thereof.

Preferably, the toggle mechanism is formed as a five-point toggle mechanism.

The at least two drive units, preferably in each case, are mounted in an articulated manner, via at least one bearing joint, on an end plate.

BRIEF DESCRIPTION OF THE DRAWINGS

Further details and advantages of the present invention are explained in more detail below with the aid of the description of the figures with reference to the embodiments represented in the figures, in which:

FIG. 1 shows a first embodiment of a clamping unit,
FIG. 2 shows a second embodiment of a clamping unit,
FIG. 3 shows a third embodiment of a clamping unit,
FIG. 4 shows a fourth embodiment of a clamping unit,
FIG. 5 shows an embodiment of a bearing plate or a crosshead,
FIGS. 6-8 show different embodiments of an end plate,
FIG. 11 shows a further embodiment of a bearing plate.

DETAILED DESCRIPTION OF THE INVENTION

FIG. 1 shows a first embodiment of a clamping unit 2 according to the invention for a moulding machine 1. Here, the clamping unit 2 has a moving moulding platen 4, which is mounted movable with respect to a fixed moulding platen 5.

Figure 12:
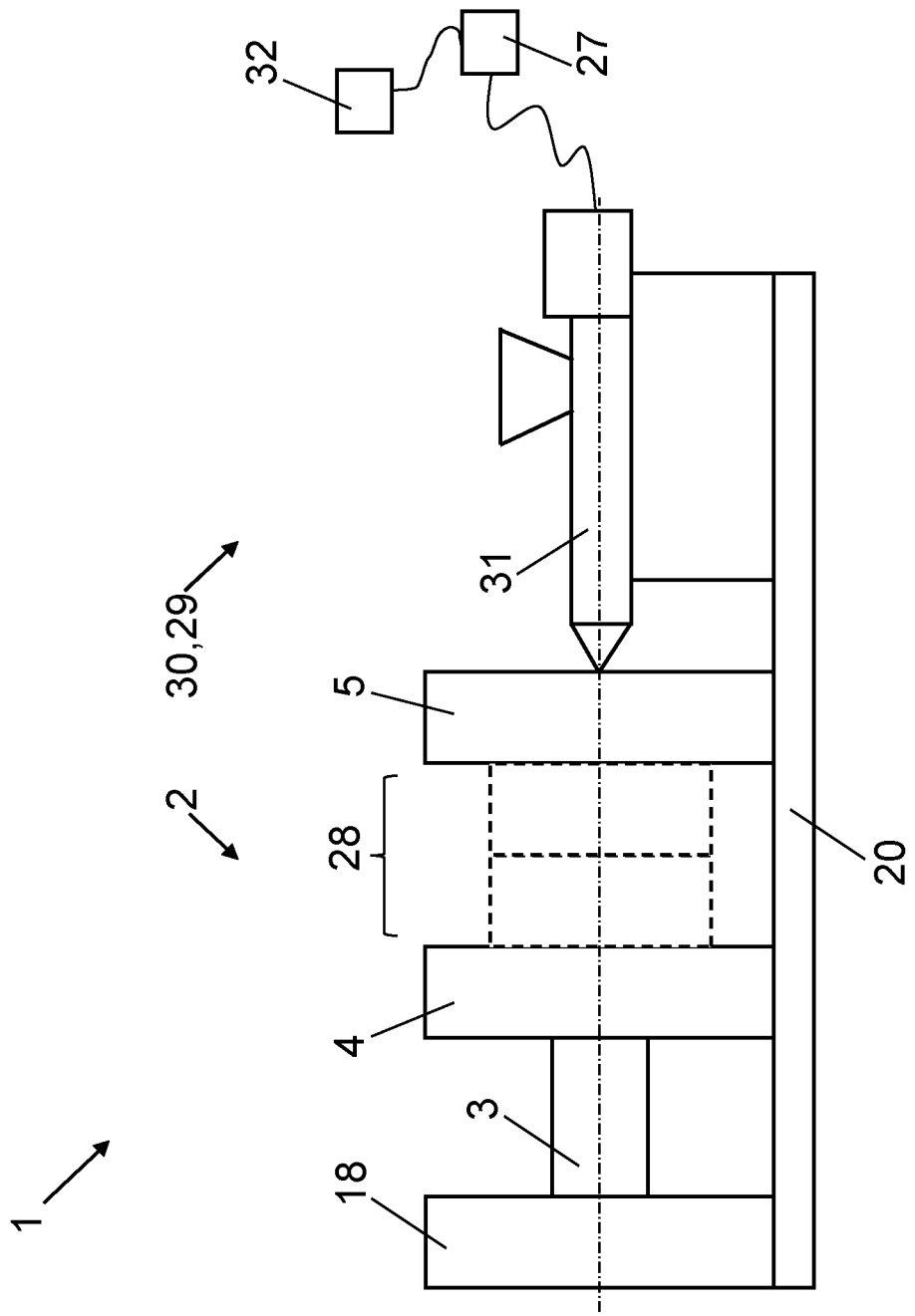
FIG. 12 shows a moulding machine.

In this embodiment, the fixed moulding platen 5 is not represented for reasons of clarity. Reference is made to FIG. 12 regarding the cooperation of the clamping unit 2 and the moulding machine 1.

The moving moulding platen 4 is guided with a guide with respect to a frame 20. This frame 20 can be formed as a machine frame for the entire moulding machine 1, for example, or also can be provided separately merely for the clamping unit 2.

The guiding of the moving moulding platen 4 with respect to the frame 20 is effected via a guide rail 16, on which the movable moulding platen 4 is mounted such that it can slide.

The end plate 18 is arranged longitudinally displaceable with respect to the frame 20 along, for example, tie bars having the axis 33, which tie bars are fixedly connected to the moulding platen 5 (mould height adjustment). The movement of the moulding platen 4 and a clamping force with respect to a fixed moulding platen 5 can be generated by the toggle mechanism 3 between the end plate 18 and the moving moulding platen 4.

Two (first and second) drive units 6, 7, which are implemented as linear drives (for example spindle drives or piston-cylinder units), are provided for driving the toggle mechanism 3.

These linear drives 6, 7 are on the one hand mounted in an articulated manner on the end plate 18 by a bearing joint 23 and on the other hand are connected to a bearing plate 11 via a bearing point 8 which is formed as an articulation 12.

The bearing plate 11 of this embodiment is implemented as a crosshead 9 of the toggle mechanism 3 and, via the fastening points 10, connects the toggle levers (see levers at top and bottom of the crosshead 9 in FIG. 1) to the drive units 6, 7 via the bearing points 8.

In this embodiment, the bearing plate 11, more specifically the crosshead 9, is guided via the guide 14.

This guide 14 has a guide pillar 15, which guide pillar 15 on the one hand is mounted in the end plate 18 itself and on the other hand is received on a fastening lug 19 (which can be part of the end plate 18).

In particular, the fastening lug 19 can be formed in one piece with the end plate 18 or can be implemented by an additional component, which is connected to the end plate 18.

The bearing plate 11, more specifically the crosshead 9, is guided on the guide pillar 15 by the guide shoe 17.

Because the bearing point 8 of the drive units 6, 7 is formed as an articulation 12, a deformation of the crosshead 9 or the bearing plate 11, or also the drive units 6, 7, becomes possible without (or at least only to a small extent) the individual deformations of these components being transferred in each case to the others.

In this embodiment, this articulation 12, which connects the drive units 6, 7 to the bearing plate 11, is implemented as a flexure hinge, as is represented schematically in the lower bearing point 8 in FIG. 1 (reference may be made to FIGS. 5-8 with regard to more accurate designs and implementations of such a flexure hinge). In the present embodiment, it is provided that both bearing points 8 are formed as articulations 12.

Through this articulated mounting, the problem that the drive units 6, 7 can have variations in their driving forces, which cannot be corrected by control technology, is overcome.

Through this articulated mounting and the permitted deformation, these differences in the driving forces can be compensated for and converted into a deformation.

Alternatively, the possibility is also created that inclines of the crosshead 9 relative to an imaginary perpendicular can be adjusted in a targeted manner (for example because the drive units 6, 7 interdependently cover appropriate movement paths).

By adjusting inclines of the crosshead 9, clamping forces of the clamping unit 2 can be displaced asymmetrically. Through a corresponding asymmetrical displacement of the clamping forces, asymmetries of a mould 28 can in turn be compensated for in a targeted manner or vibrations can be damped.

FIG. 2 shows a second embodiment of a clamping unit 2 according to the invention, wherein again a crosshead 9, which represents the bearing plate 11, can be driven by two drive units 6, 7. The drive units 6, 7 are again connected to the bearing points 8 of the crosshead 9 via articulations 12.

However, unlike in FIG. 1, the drive units 6, 7 are jointly hinged to the end plate 18 via a single bearing joint 23.

A further difference from FIG. 1 is that the crosshead 9 or the bearing plate 11 is guided on the guide rail 16 on the frame 20 via a guide shoe 17. This guide 14 can substantially correspond to the guiding of the moving moulding platen 4 on the frame 20.

The remaining details of this embodiment correspond to those of FIG. 1.

FIGS. 3 and 4 show alternative embodiments to those of FIGS. 1 and 2, wherein the drive units 6, 7, instead of a vertical orientation (in which the drive units 6, 7 are arranged one above the other), can also be arranged horizontally (or also one behind the other) with respect to one another. FIGS. 3 and 4 thus show the corresponding part of the clamping unit 2 in top view.

FIG. 3 again shows an embodiment in which the drive units 6, 7 are hinged to the end plate 18 by separate bearing joints 23, whereas FIG. 4 shows an embodiment in which the drive units 6, 7 are jointly connected to the end plate 18 via a single bearing joint 23.

FIG. 5 shows an embodiment of a bearing plate 11, more specifically a crosshead 9, of a clamping unit 2.

FIGS. 6, 7, 8 show different embodiment variants of an end plate 18 with flexure hinges with different variants for connecting the drives.

Here it can be seen how clearances 13 are provided in different ways around a bearing point 8.

Through these clearances 13, flexure hinges are formed around the bearing point 8, 23, which enable an articulated connection of a drive unit 6, 7 at the bearing point 8 around a pivot axis 22.

These clearances 13 can, for example, be formed by drilled holes, recesses and/or openings, which preferably vary a thickness of the bearing plate 11 and/or penetrate the thickness of the bearing plate.

The clearances 13 can be produced through a wide variety of manufacturing processes, such as preferably by moulding (e.g. corresponding shaping during the casting of the bearing plate) or forming (e.g. milling, drilling or other material-removing processes).

Depending on the arrangement, geometry or selection of the clearance 13, the pivot axis 22 can be oriented individually or for example, as can be seen in FIG. 7, a common pivot axis can also be formed for two bearing points 8.

Figure 9:
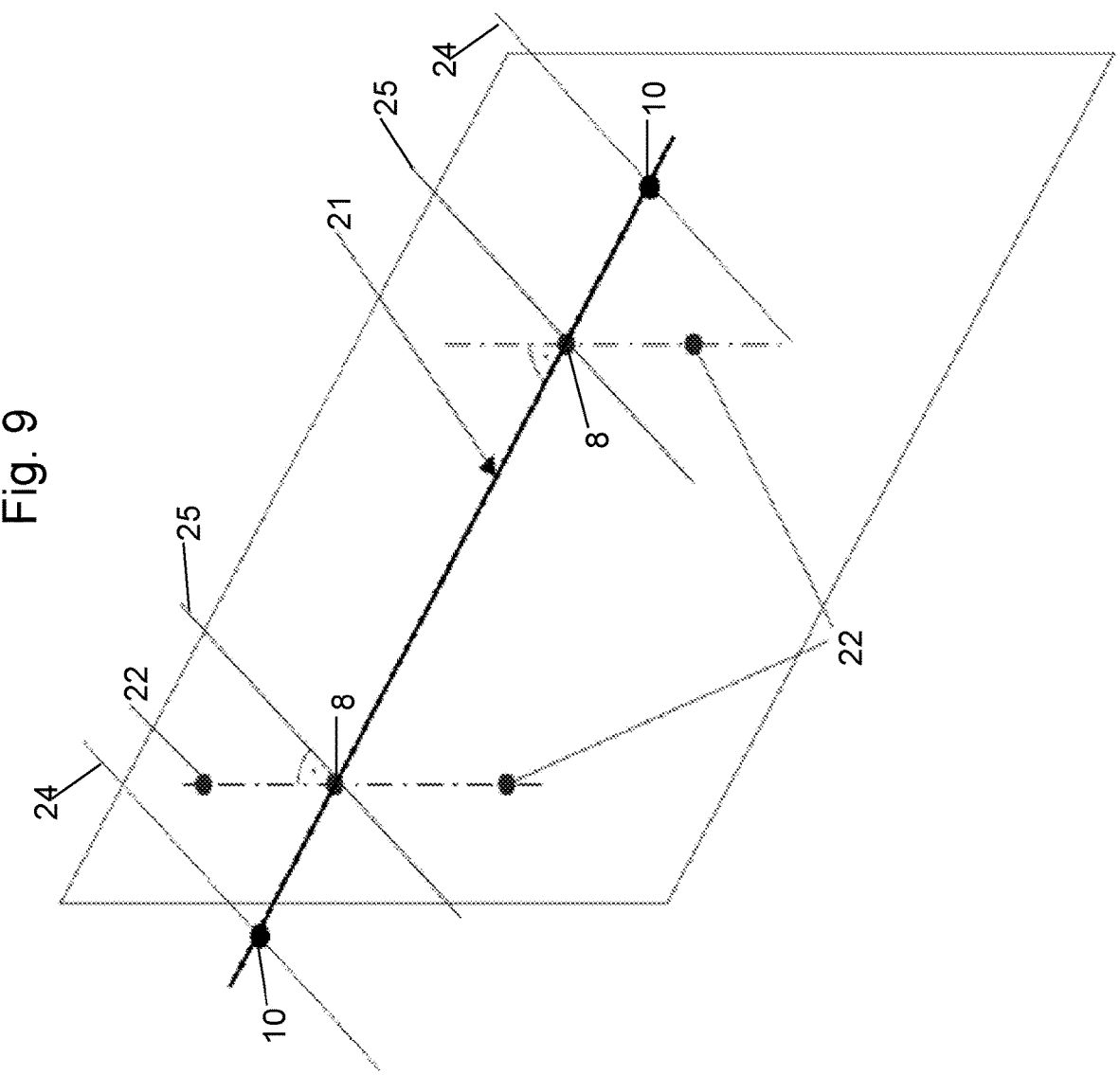
FIG. 9 shows a schematic representation of the embodiments from FIGS. 1 to 4, FIGS. 10a-10c show a further embodiment of a bearing plate.

The position of the bearing points 8 on the bearing plate 11 of one of the embodiments from FIG. 5 and FIG. 8 in the undeformed state is represented schematically in FIG. 9. Here, an imaginary connecting line 21 is shown, which connects the two bearing points 8 and the fastening point 10 to each other. In this FIG. 9, the two bearing points 8 and the fastening point 10 are represented as dots and are to be understood as the resulting engagement points of the forces transferred through them to the bearing plate 11.

Furthermore, the axes of symmetry 24 of the adjoining toggle lever elements of the toggle mechanism 3 and the axes of symmetry 25 of the drive units 6, 7 can be seen, which (because the bearing plate 11 is in an undeformed state) correspond to the direction of the linear movement and also the direction of a force that can be introduced by the drive units 6, 7.

In preferred embodiments, the pivot axis 22 of the articulation (flexure hinge) 12 formed through the clearances 13 runs at right angles to the imaginary connecting line 21 and the axes of symmetry 24, 25.

FIG. 10a shows a further embodiment of a bearing plate 11, which again has two bearing points 8 and two fastening points 10.

The bearing plate 11 represented here is designed as a crosshead 9 for a toggle mechanism, wherein the bearing plate 11 can be connected to toggle levers of the toggle mechanism 3 via connecting pins at the fastening points 10.

It can again be seen that, in an undeformed state of the bearing plate 11, the bearing points 8 and the fastening point 10 lie along a common imaginary connecting line 21 and a driving force can be introduced into the bearing plate 11 along a force direction (which in turn corresponds to the axis of symmetry 25 of the drive units 6, 7) via the bearing points 8, and a pivot axis 22 of the articulation 12 runs at right angles to the connecting line 21 and at right angles to the force direction.

FIG. 10b is a top view and FIG. 10c is a side view of the bearing plate 11 from FIG. 10a, wherein in FIG. 10c a spindle drive is indicated, which is attached to the bearing point 8 of the bearing plate 11 with its spindle nut.

FIG. 11 shows a further embodiment of a bearing plate 11, which, like the embodiment of FIG. 10, again has two bearing points 8 and two fastening points 10.

The bearing plate 11 represented is again formed as a crosshead 9 for a toggle mechanism 3. However, in this embodiment, the bearing points 8 are mounted on the bearing plate 11 via a pivot element 26 (kingpin)—put simply, a pin.

The moulding machine 1 represented in FIG. 12 has an injection unit 30 and a clamping unit 2, which are arranged together on a frame 20 (which is formed as a machine frame).

The clamping unit 2 has a stationary moulding platen 5, a movable moulding platen 4 and an end plate 18.

As a rule, the fixed moulding platen 5 is connected to the end plate 18 by tie bars, which are not represented in the figures for the sake of clarity.

The fixed moulding platen 5 is fixedly connected to the frame 20 of the moulding machine 1, wherein the end plate 18 is arranged adjustable along the guide rail 16 parallel to the frame 20 via the mould height adjustment and is therefore displaceably adjustable relative to the fixed moulding platen 5 for mould height adjustment.

The movable moulding platen 4 is movable relative to the frame 20 via a toggle mechanism 3.

Mould halves of a moulding tool 28 (represented dashed) can be clamped or mounted on the fixed moulding platen 5 and the moving moulding platen 4.

The moulding tool 28, represented clamped in FIG. 12, has at least one cavity. An injection duct, via which a plasticized material of the plasticizing unit 29 can be supplied, leads to the cavity.

The injection unit 30 of this embodiment has an injection cylinder 31 and an injection screw arranged in the injection cylinder 31. This injection screw is rotatable about its longitudinal axis and axially movable in the conveying direction along the longitudinal axis.

These movements are driven via a schematically represented drive unit. This drive unit preferably comprises a rotary drive for the rotational movement and a linear drive for the axial injection stroke.

FIG. 12 shows a moulding machine 1 with an injection unit 30, wherein the injection unit 30 shown in this embodiment has an injection screw which is also utilized for the plasticization of a material to be plasticized (and thus likewise forms the plasticizing unit 29 of the moulding machine 1).

The injection screw is mounted axially displaceable along a longitudinal axis in the injection cylinder 31.

The plasticizing unit 29 (and thus the injection unit 30) is in signalling connection with a control or regulation unit 27. Control commands are issued to the plasticizing unit 29 by the control or regulation unit 27.

The control or regulation unit 27 can be connected to an operating unit and/or a display device 32 or be an integral part of such an operating unit.

LIST OF REFERENCE NUMBERS 1 moulding machine
2 clamping unit
3 toggle mechanism
4 movable moulding platen
5 fixed moulding platen
6 drive unit
7 drive unit
8 bearing point
9 crosshead
10 fastening point
11 bearing plate
12 articulation
13 clearance
14 guide
15 guide pillar
16 guide rail
17 guide shoe
18 end plate
19 fastening lug
20 frame
21 connecting line
22 pivot axis
23 bearing joint
24 axis of symmetry
25 axis of symmetry
26 pivot element
27 control or regulation device
28 moulding tool
29 plasticizing unit
30 injection unit
31 injection cylinder
32 display device
33 longitudinal axis

The invention claimed is:

1. A clamping unit for a moulding machine, comprising:
a toggle mechanism configured to move a movable moulding platen with respect to a stationary moulding platen and/or to apply a force to the movable moulding platen, the toggle mechanism having a movably mounted bearing plate, the movably mounted bearing plate having a one-piece construction; and
at least two drive units for driving and actuating the toggle mechanism, wherein each of the at least two drive units is directly connected in an articulated manner to the movably mounted bearing plate of the toggle mechanism via a respective bearing point formed as an articulation to actuate the toggle mechanism.

2. The clamping unit according to claim 1, wherein the bearing plate has a fastening point for connection to toggle levers of the toggle mechanism.

3. The clamping unit according to claim 2, wherein the bearing plate has an articulation connecting the fastening point to the respective bearing point of each of the at least two drive units such that a twisting between the bearing points of the at least two drive units caused by a driving force and a reactive force can be at least partially compensated for by the articulation.

4. The clamping unit according to claim 1, wherein each respective bearing point connecting a respective one of each of the at least two drive units directly to the movably mounted bearing plate is a flexure hinge.

5. The clamping unit according to claim 2, wherein the articulation comprises a clearance with recesses, drilled holes, and/or openings.

6. The clamping unit according to claim 2, wherein the bearing plate has a guide configured to guide the bearing plate on a guide pillar and/or a guide rail.

7. The clamping unit according to claim 6, wherein the guide pillar and/or the guide rail is mounted on:
an end plate of the clamping unit and/or
a frame of the clamping unit.

8. The clamping unit according to claim 3, wherein the bearing plate has a guide configured to guide the bearing plate on a guide pillar and/or a guide rail, and wherein the articulation is a first articulation, the clamping unit further comprising a second articulation between the guide and at least one of the bearing points of the at least two drive units.

9. The clamping unit according to claim 2, wherein, in an undeformed state of the bearing plate, bearing points of the at least two drive units and the fastening point lie along a common imaginary connecting line, and the at least two drive units are configured to apply a driving force into the bearing plate along a force direction via the bearing points of the at least two drive units, and a pivot axis of the articulation runs at a right angle to the connecting line and at a right angle to the force direction.

10. The clamping unit according to claim 1, wherein each of the at least two drive units has a spindle drive and/or a piston-cylinder unit.

11. The clamping unit according to claim 1, wherein each of the at least two drive units has a hydraulic, pneumatic, electrical, magnetic drive and/or a hybrid variant thereof.

12. The clamping unit according to claim 1, wherein the toggle mechanism is a 5-point toggle mechanism.

13. The clamping unit according to claim 1, wherein the at least two drive units are mounted in an articulated manner on an end plate via a bearing joint.

14. A moulding machine comprising:
   the clamping unit according to claim 1;
   a stationary moulding platen; and
   a movable moulding platen to be moved by the clamping unit relative to the stationary moulding platen.

15. The clamping unit according to claim 1, wherein the movably mounted bearing plate is a crosshead of the toggle mechanism.

16. The clamping unit according to claim 5, wherein the articulation is configured to vary a thickness of the bearing plate and/or penetrate a thickness of the bearing plate.

17. The clamping unit according to claim 7, wherein the guide pillar and/or the guide rail is mounted on an end plate of the clamping unit and a fastening lug protruding from the end plate.

\* \* \* \* \*